United States Patent
Gat et al.

(10) Patent No.: US 7,157,706 B2
(45) Date of Patent: Jan. 2, 2007

(54) CRYOGENICALLY COOLED ADJUSTABLE APERTURES FOR INFRARED CAMERAS

(75) Inventors: Nahum Gat, Manhattan Beach, CA (US); John Dwight Garman, Costa Mesa, CA (US)

(73) Assignee: Opto-Knowledge Systems, Inc., Torrance, CA (US)

( * ) Notice: Subject to any disclaimer, the term of this patent is extended or adjusted under 35 U.S.C. 154(b) by 0 days.

(21) Appl. No.: 10/250,016

(22) Filed: May 28, 2003

(65) Prior Publication Data

US 2004/0238741 A1    Dec. 2, 2004

(51) Int. Cl.
*G01J 5/00*    (2006.01)

(52) U.S. Cl. .................... 250/338.1; 250/347
(58) Field of Classification Search ........... 250/338.1, 250/347
See application file for complete search history.

(56) References Cited

U.S. PATENT DOCUMENTS

| | | | |
|---|---|---|---|
| 24,356 A | 6/1859 | Miller | 396/510 |
| 582,219 A | 5/1897 | Mosher | 396/459 |
| 4,583,814 A * | 4/1986 | Koetser | 374/124 |
| 4,783,593 A * | 11/1988 | Noble | 250/352 |
| 5,737,119 A | 4/1998 | Mladjan | 359/353 |
| 5,966,945 A * | 10/1999 | Mengel et al. | 62/51.1 |
| 6,122,919 A * | 9/2000 | Patel et al. | 62/51.1 |
| 6,133,569 A * | 10/2000 | Shoda et al. | 250/332 |
| 6,174,061 B1 * | 1/2001 | Cooper | 359/857 |
| 6,414,708 B1 * | 7/2002 | Carmeli et al. | 348/42 |
| 6,707,044 B1 * | 3/2004 | Lannestedt et al. | 250/351 |
| 6,806,471 B1 * | 10/2004 | Matsukuma et al. | 250/339.15 |
| 2003/0161049 A1 * | 8/2003 | Okada et al. | 359/696 |
| 2004/0129881 A1 * | 7/2004 | Hamrelius et al. | 250/330 |

FOREIGN PATENT DOCUMENTS

JP    05172635 A  *  7/1993

\* cited by examiner

*Primary Examiner*—Otilia Gabor
*Assistant Examiner*—Christine Sung
(74) *Attorney, Agent, or Firm*—Ronald M. Goldman

(57) ABSTRACT

A continuously variable diaphragm or swappable fixed aperture for use in thermal infrared cameras, which aperture or diaphragm can be cooled to cryogenic temperatures. The invention contemplates mounting aperture control means, if necessary, in a vacuum or extending the control mechanism through a vacuum in a thermally isolated manner to avoid radiation load on the photocell. The inventive method implements such a diaphragm and control system. The invention makes possible the object of using a single thermal infrared camera under a wide variety of target-scene radiation conditions that may be rapidly changing, with interchangeable or zoom camera lenses requiring matching or different size cold stops, and under other such dynamic situations.

14 Claims, 9 Drawing Sheets

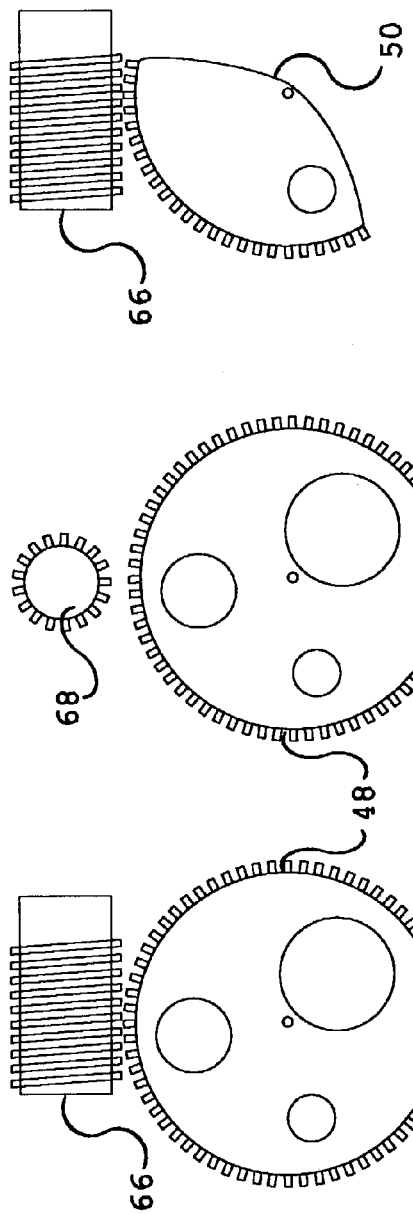
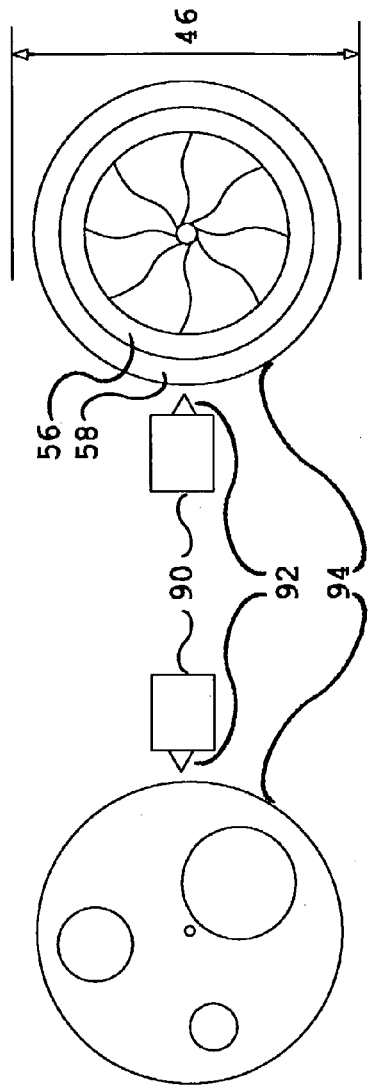

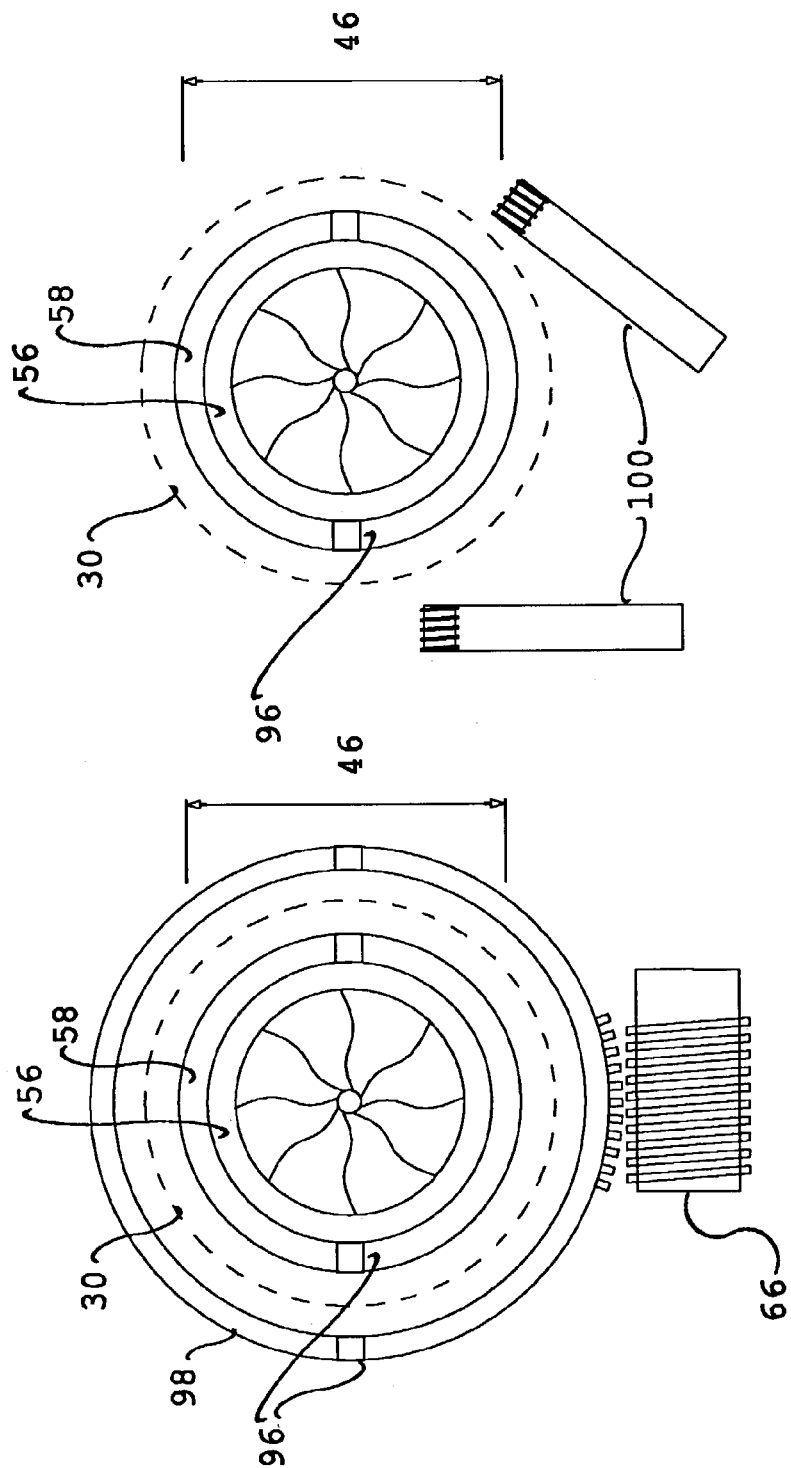

CRYOGENICALLY COOLED ADJUSTABLE APERTURES FOR INFRARED CAMERAS

FEDERAL RESEARCH STATEMENT

This invention was made with U.S. Government support under SBIR Contract No. DAAB07-03-C-P004 awarded by the Department of the Defense. The U.S. Government has a royalty-free right to the use of this invention.

BACKGROUND OF INVENTION

1. Field of the Invention

The invention relates to radiant energy, photocell arrays for capturing such energy, apparatus containing such photocells, including thermal infrared cameras, and more particularly to the optical or pre-photocell system, and to light valves, apertures, diaphragms, irises, and to the temperature control thereof. The method and apparatus of the invention shows particular utility in fire fighting, military, law enforcement, search and rescue, and agricultural applications or in any other application utilizing infrared imaging or detecting.

2. Background

The background of this invention involves thermal infrared cameras (throughout, the use of "infrared camera" is meant to be inclusive of "thermal infrared camera"), variable diaphragms and swappable fixed apertures. Infrared cameras are well known in the art. The typical infrared camera is comprised of at least several of the below described basic parts, with the most sophisticated infrared cameras comprised of most or all of these prior art parts. The variable diaphragm and swappable fixed aperture are also well known in the art, as are logic control systems.

Thermal infrared radiation is the emission of photons by all objects that are at a temperature above absolute zero. Thermal infrared radiation decreases very rapidly as the temperature of an object decreases.

Infrared Cameras:

Central to all infrared cameras is an infrared sensitive photocell. The photocell is highly sensitive to thermal infrared radiation (hereinafter referred to as "radiation"). The photocell is exposed to radiation emanating from the object or scene being imaged. However, the camera enclosure also emits radiation that can reach the photocell. This undesired radiation negatively affects the operation of the camera and therefore the photocell can be enclosed within a cold structure (referred to as a "radiation shield"). The design of the radiation shield is dictated simply: if an observer were to look out from the photocell, anything the observer could see would emit radiation that would arrive at the photocell. In order for the radiation shield to block the undesired radiation, it must be the only internal camera structure that the photocell can "see." The "cold stop," which is simply a name for a cooled aperture, provides the only path for external radiation to reach the photocell, through the focusing optics. The radiation shield should therefore also not emit an excess of radiation itself. The cold stop size is a compromise between the effectiveness of blocking the unwanted radiation (requiring a small aperture) and excessive vignetting (requiring a large aperture).

In order to keep the photocell and other components of the infrared camera cool, there is often an active cooler integrated into the camera. Typically, the cooling system must maintain a fixed temperature in order to control the unwanted radiation seen on the photocell, although ideally the radiation shield is cold enough to produce a negligible amount of radiation onto the photocell. This fixed temperature has a known effect on the photocell that can be removed through image post processing. The photocell is also cooled to improve its radiation sensitivity and reduce the internally generated current, as the higher the temperature of the photocell, the lower its usable dynamic range. A thermoelectric cooler, such as a Peltier cooler, typically cools such infrared cameras. However, in more sensitive systems where the signal to noise ratio is far more important, the system must be cooled to as low a temperature as reasonably possible, to minimize any unwanted radiation loading. In these systems, there are several options for achieving the necessary cooling, including integrating the cameras into dewars for liquid nitrogen or liquid helium, Stirling cryogenerators, Gifford-McMahon mechanical coolers, and other such devices.

To reduce thermal load on the cooling system, infrared camera designers often place all of the cooled elements into a vacuum vessel. Within the vacuum vessel, the radiation shield and the photocell are maintained at a low, sometimes cryogenic, temperature, based on the photocell requirements and the desired performance. The vacuum vessel, (if one is present) often constitutes a camera housing, which also often contains, or provides, a mounting apparatus for the infrared focusing lens (throughout, "lens" is inclusive of all light collecting devices including refractive or reflective systems).

Thermal infrared cameras must be able to accommodate both hot and cold target objects and scenes, while distinguishing target from background radiation. Although the thermal control methods described above can allow a camera to be used in a wide variety of thermal scenes, drastic changes in radiation quantities require different camera settings. If the scene is too cool for ideal use with the camera, the camera operator can take a longer exposure. This method may adversely affect the frame rate and may lead to resolution problems if the camera or target is moving. Another solution typically used in the art is to change the electronic gain of the signal from the photocell, although a higher gain also increases the noise in the electronic signal. Conversely, in hot scenes, reduced exposure time, reduced signal gain, or a combination of the two can allow an infrared camera to capture the scene.

Apertures and Cold Stops:

A cold stop is simply a temperature-controlled aperture. In its most basic form, the cold stop is a fixed aperture, similar to the aperture found in some disposable light cameras. Variable diaphragms (hereinafter used interchangeably with an "iris") and swappable fixed apertures for light cameras have been described in patent art for many years (see e.g., U.S. Pat. No. 24,356 to Miller and Wirsching in 1859, U.S. Pat. No. 582,219 to Mosher in 1897). The variable diaphragm works by allowing more or less of the radiation (visible light, in the case of visible light cameras) that reaches the focusing lenses to pass through to the photocell or film. The focusing lens receives radiation and focuses it based on the distance from the radiation source to the lens and the prescription of the lens. The prescription includes the focal length and the f-number. In conventional light cameras, the aperture is typically built into the compound lens assembly. That aperture then lets pass a certain desired portion of the radiation intercepted by the lens.

With a very large aperture, nearly all of the light arriving at the focusing lens passes through the aperture. By reducing the size of the aperture, the mechanism of the aperture itself blocks a portion of the light from entering. In typical light cameras, the aperture is located at the point where the cone of light from the object is wide and thus diminishes the light intensity without affecting the image quality. Lenses may have specific aperture requirements, which determine the optimum position and size of the aperture. This is typically a function of the f-number (hereinafter interchangeably also referred to as "f/#"), the focal length of the lens, and the construction. However, in infrared cameras, the aperture cannot be located in the lens since the lens is uncooled. The aperture is typically located in the converging path of the light; that is, between the lens and the focal plane, so the aperture first reduces the image intensity and then, with reducing aperture size, begins to vignette, or cut off, the outer edges of the image. The aperture thus defines an effective f/# for the system.

As a result, when interchangeable lenses of a different f/# are used with an infrared camera, the system f/# may not match the lens f/#. There is heretofore no solution to this problem in the prior art. A variable diaphragm or aperture, however, can correct this situation and match the system f/# to the specific lens in use. By lens, we refer to all light collecting devices including refractive or reflective systems.

U.S. Pat. No. 6,133,569 to Shoda and Ishizuya discloses a thermal infrared camera incorporating all of the above-mentioned features. The Â□569 patent further describes the promising idea of using variable diaphragms in thermal feedback infrared cameras, that is, in cameras with thermal sensors controlling cooling elements. Specifically, Shoda and Ishizuya suggest the use of an optically variable diaphragm optionally thermally coupled to the infrared radiation shield. However, due to the limitations discussed below in regards to cooling the variable diaphragm, the Â□569 patent has not made possible the use of such a variable diaphragm.

The use of continuously variable diaphragms or swappable fixed apertures in thermal infrared cameras has to date not been viable because of fundamental packaging and thermal control problems. As described above, the aperture must be cooled. While an effectively cooled variable diaphragm is difficult to design, the problem becomes considerably more difficult if the aperture must be kept at cryogenic temperatures and located inside a vacuum chamber. Within a vacuum chamber, the aperture and the associated drive mechanisms cannot outgas. Depending on the depth of vacuum, this may require a completely dry iris and specially designed lubricants, electrical wiring, motors, and gears. Moreover, the drive mechanism cannot add heat load onto the cooling system, nor allow conductive heat load from the ambient vacuum enclosure to affect the cooling system. Equally important, the aperture must dissipate energy from the radiation that it blocks. These and other considerations for the aperture itself have made implementing a variable diaphragm impossible given the prior art.

Further, with continuously variable diaphragms or swappable fixed apertures, there must be some mechanism for changing the aperture. There must be mechanical, electromagnetic, piezoelectric, or other such control means to change the diaphragm size or swap fixed apertures. The control means must be strong enough to operate the variable diaphragm or swappable fixed aperture in a timely manner, and either thermally isolated from the photocell or able to operate at cryogenic temperatures. As mentioned above, if the aperture is in a vacuum, the control means must be small enough to contain within the vacuum chamber or must provide a means for transferring mechanical force through the wall of the vacuum chamber. Where such transfer of mechanical force occurs, there must be complex seals to ensure the vacuum is not compromised and that excessive heat is not conducted into the radiation shield.

Aperture control means located in a vacuum chamber have several constraints that make their implementation significantly less feasible. First, the materials used in conjunction with the control means cannot outgas, as vaporized materials not only destroy the vacuum that provides the thermal isolation for the cold components, but also condense on the photocells. For this reason, bearings, linings, coatings, winding insulation, and any cements or glues must be eliminated or replaced with a fluorinated polymer or polytetrafluoroethylene based insulation or otherwise coated or manufactured with special non-outgassing materials.

Moreover, the motor control means must also be able to cool itself effectively without the typical convection of heat into air. This means that all heat generated in the motor must be dissipated through conduction to the motor mounting apparatus. The control means must therefore be thermally isolated from the aperture it controls. The motor must incorporate heat-reducing technology, including bipolar drives, low current standby systems, and other such options. Furthermore, the diaphragm control means must not produce electromagnetic interference (EMI) that can distort the electronic signal produced by the photocell. Mechanical or other temperature control means must often also be associated with the motor.

Finally, for control means located in a vacuum, there is an additional potential problem created by high voltage to exposed conductors in the motor apparatus. In extremely low-pressure vacuums, the remaining air molecules subject to high voltage can ionize and current will flow as if the vacuum chamber were an electron tube, creating strong corona effects. These effects are particularly problematic near highly sensitive photocells, so careful insulation is needed on any exposed electric contacts.

An additional packaging problem exists where a variable diaphragm system must fit within the same confines as an existing fixed aperture camera. In these retrofit cases, the entire aperture control means must fit within very small confines that were not designed to accommodate such hardware.

Accordingly, there is a need in the art for a continuously variable diaphragm or swappable fixed aperture along with a detailed method of implementing such a means that overcomes or avoids the above problems and limitations.

SUMMARY OF INVENTION

The invention comprises a continuously variable diaphragm or swappable fixed aperture for infrared cameras that can be cooled to cryogenic temperatures while minimizing other associated thermal problems. The invention further comprises diaphragm control means suitable, if necessary, either for mounting within a vacuum vessel or for mounting outside the vessel and transferring aperture control means into the vessel, in a thermally isolated manner to avoid excess radiation load on the photocell.

The invention additionally encompasses a method of arranging the diaphragm and diaphragm control means to make possible the object of using a single thermal infrared camera under a wide variety of target-scene radiation conditions that may be rapidly changing, with interchangeable camera optics requiring different size cold stops, and under other such dynamic situations. The invention and inventive method also make possible the object of upgrading and retrofitting fixed aperture infrared cameras with variable diaphragm hardware.

A further object of the invention is to allow the use of interchangeable optics, including interchangeable compound lenses, with a single infrared camera, by providing a means to aperture match the camera to the lenses.

The scope of application of the inventive method and apparatus is broad, as a number of alternative thermal isolation and diaphragm control means may suggest themselves to those skilled in the art as suitable for a wide variety of thermal infrared camera applications. These applications include military thermal signature identification (including aircraft, vehicle, missile identification), military and other field of view changes (switching camera use from wide area search to narrow field of view as a target is acquired and tracked, used in target tracking and fire control systems), police surveillance (detecting the presence of people, objects, etc.), general security and surveillance applications (detecting and identifying intrusions), search and rescue (finding people or vehicles), firefighting (finding victims in smoke-filled rooms), and general zooming in or out with infrared cameras, to name a few.

BRIEF DESCRIPTION OF DRAWINGS

The accompanying views of the drawings are incorporated in, and constitute a part of, this specification and illustrate one or more exemplary non-limiting embodiments of the invention, which, together with the description, serves to explain the principles of the invention. In the drawings:

FIGS. 6a, 6b, 6c, 6d, 6e, 6f, and 6g show schematic views of several embodiments of the inventive aperture drive mechanisms, highlighting implementations of the aperture with an exemplary worm gear driven swappable fixed aperture drive (6a), a gear cog driven swappable fixed aperture (6b), a simple two-aperture worm gear driven swappable fixed aperture drive (6c), an exemplary piezoelectric driven swappable fixed aperture (6d), an exemplary piezoelectric driven variable diaphragm (6e), and two exemplary embodiments of electromagnetic aperture control means (6f and 6g)

DETAILED DESCRIPTION

The following detailed description illustrates the invention by way of example, not by way of limitation of the principles of the invention. This description will clearly enable one skilled in the art to make and use the invention, and describes several embodiments, adaptations, variations, alternatives, and uses of the invention, including what are presently believed to be the best modes of carrying out the invention.

In this regard, the invention is illustrated in the several figures and is of sufficient complexity that the many parts, interrelationships, process steps, and sub-combinations thereof simply cannot be fully illustrated in a single patent-type drawing or table. For clarity and conciseness, several of the drawings show particular elements in schematic and omit other parts or steps that are not essential in that drawing to a description of a particular feature, aspect, or principle of the invention being disclosed.

Figure 1:
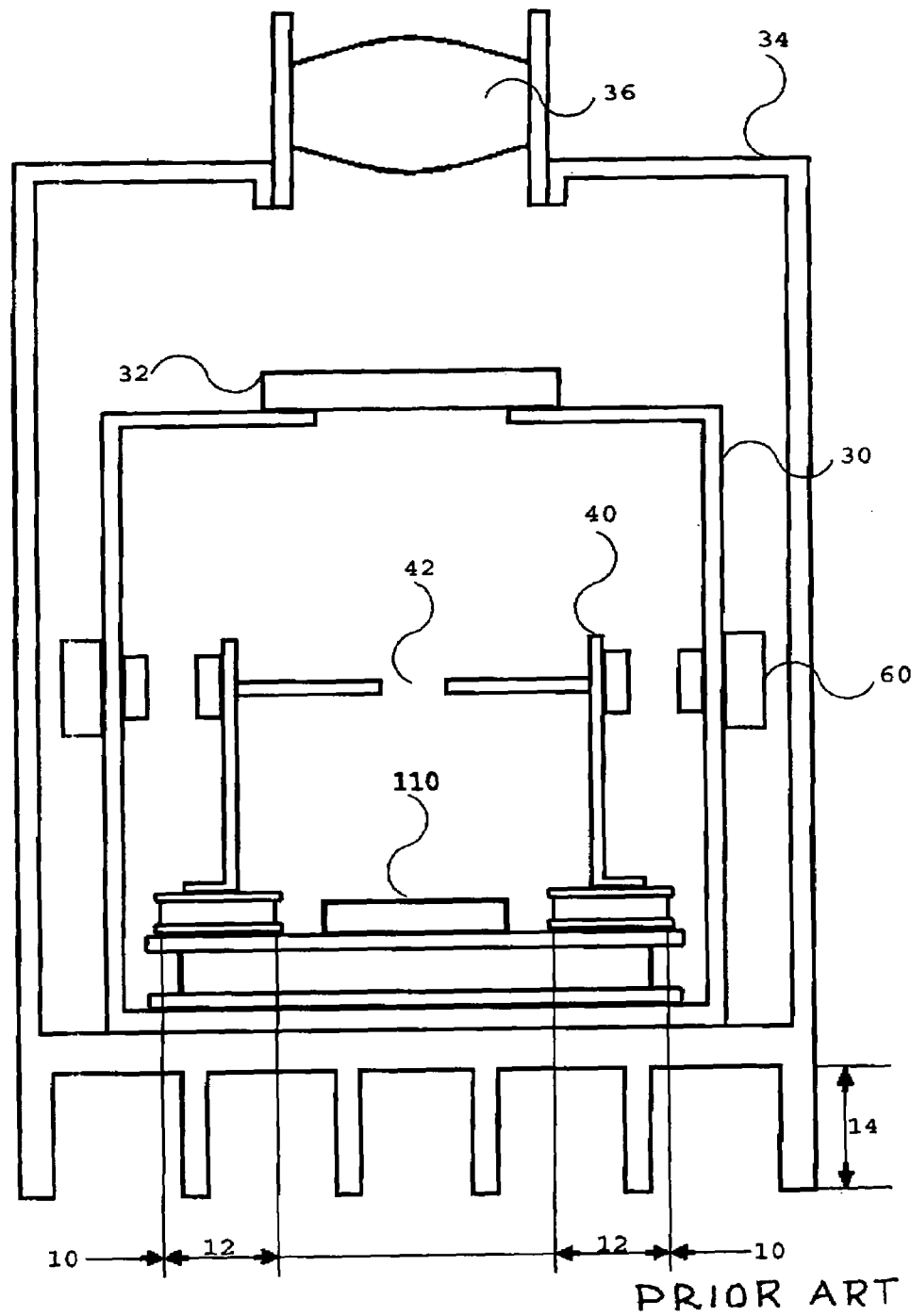
FIG. 1 shows a schematic sectional view of a prior art, the Peltier-cooled thermal infrared camera of U.S. Pat. No. 6,133,569.

The prior art infrared camera is typified by the U.S. Pat. No. 6,133,569 Peltier cooled thermal infrared camera, an embodiment of which is shown in FIG. 1. This infrared camera comprises all the basic parts of an infrared camera with a vacuum chamber. From the outside, the camera housing 34 has a focusing lens 36 as the first part of the optics system and cooling fins 14 to disperse the heat extracted by the cooling Peltier elements 10, 12. Contained within the housing is the vacuum chamber 30, with its transmissive window 32, allowing infrared radiation to pass to the inner part of the infrared camera. The vacuum chamber 30 also shows the contemplated aperture control means 60. Within the vacuum chamber 30 is the cooling Peltier elements 10, 12 showing separate elements for the photocell 110 (cooler 10) and the radiation shield 40 (cooler 12). The radiation shield 40 comprises an aperture 42, which allows infrared radiation to pass to the photocell 110. Shown also is the contemplated variable diaphragm mechanism 60, which has heretofore been impossible to implement in an infrared camera.

Figure 2:
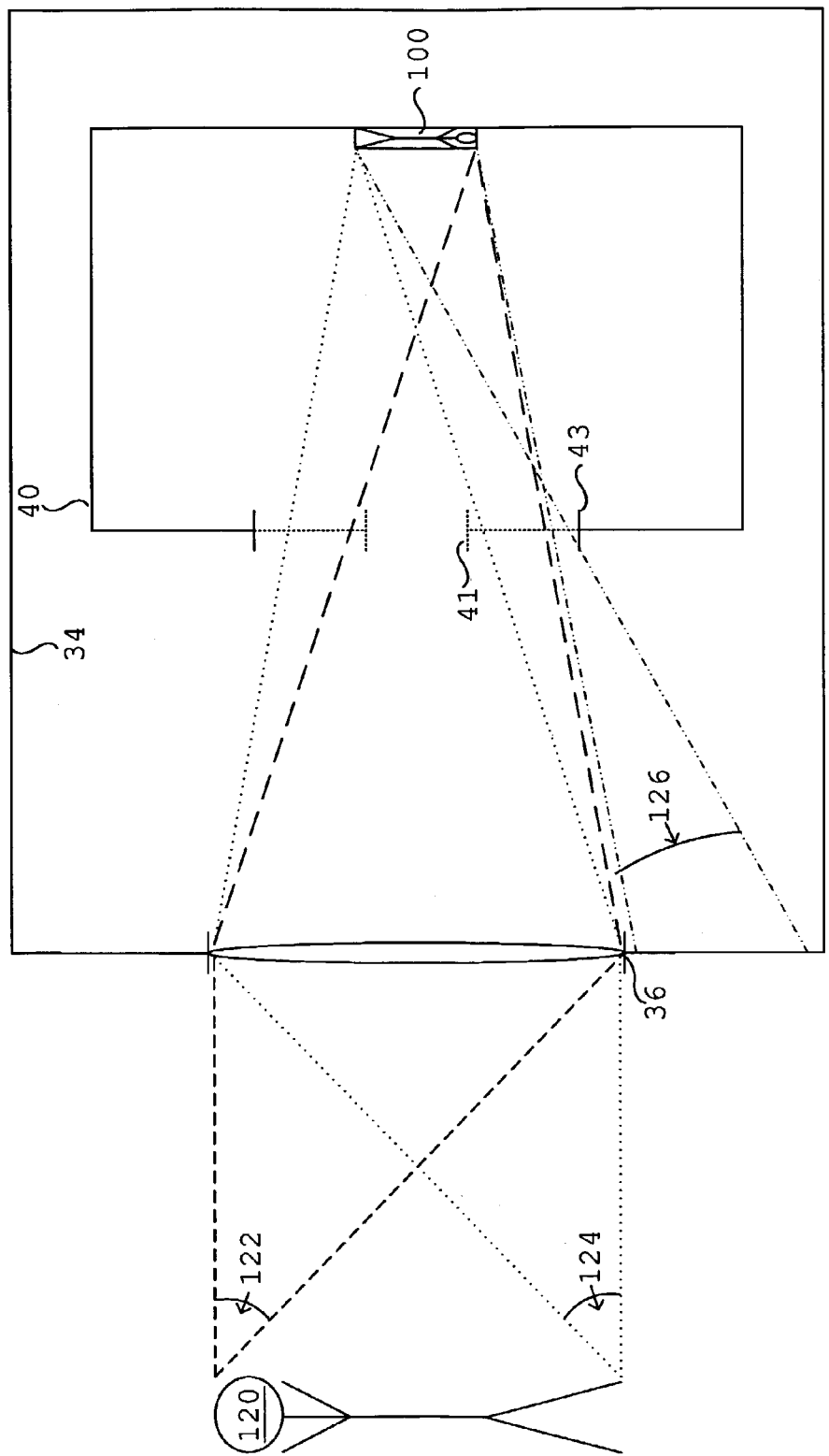
FIG. 2 shows a schematic view of light entering a focusing lens and being focused through an aperture at a photocell, illustrating the effects of various sized apertures on images and on unwanted thermal loads.

FIG. 2 shows a schematic view of radiation collected by a focusing lens that then focuses that radiation at the photocell, through an aperture, illustrating how the aperture can block too much radiation or too little radiation, demonstrating the balance between vignetting and cold stop effectiveness. Two sizes of a possible aperture are shown: a large aperture 43, and a smaller one, 41. The radiation originates at the source 120 (whether the radiation is light reflecting off an object, heat emanating from the object, or a combination of the two, is unimportant). Radiation from each point of the source travels in many directions. Significant here is that radiation (cones 122 and 124, drawn with dashed and dotted lines, respectively) arrives anywhere on the focusing lens 36. That radiation 122, 124 is focused onto the photocell 110, arriving at a location on the photocell relative to the originating source location to create an image of the original source 120 on the photocell 110.

In this case, radiation cone 122 emanating from the head of the source 120 arrives at the bottom of the photocell 110, where an image of the head is made. The same focusing applies to radiation (cone 124, drawn with dotted lines) emanating from a point at the bottom of the source. This radiation 124 focuses to the optics side of the photocell 110. In this way, the entire source 120 is imaged upside down onto the photocell 110. The invention, however, is not limited to applications with optics that invert the image. If a small aperture 41 is used, the aperture blocks a portion of the radiation being focused toward the photocell and that radiation cannot pass.

The aperture size is also dictated by the need to reduce or eliminate radiation emanating from non-cooled portions of the camera, because such undesirable radiation would otherwise arrive at the photocell. This aspect of aperture size is shown in FIG. 2, where radiation "cone" 126 (the two lines shown of the "cone" encompass the relevant extremes of undesirable radiation) emanates from the camera housing beyond the focusing lens 36. That cone of radiation 126 is blocked by the small aperture 41 but allowed to reach the photocell by the large aperture 43. Noticeably, by reducing the size of the large aperture 43 slightly, additional extraneous radiation 126 can be blocked, without affecting the source radiation cone 122. By reducing the size of the aperture 43 and impinging on the source radiation cone 122, more of the uncooled radiation cone 126 can be blocked. In this manner, between the too small 41 and too large 43 apertures is an appropriately sized aperture that offers the best compromise between vignetting and cold stop efficiency.

Further complicating the aperture design, specific coatings are required for the photocell-side of the aperture as well as the inside of the radiation shield 40, since radiation from cone 126 reflecting off the radiation shield 40, should be damped or absorbed as efficiently as possible to reduce stray light load at the photocell 110. If the photocell-side of the aperture reflects radiation, stray radiation in the radiation shield 40 may be deflected onto the photocell 110.

The problem with aperture sizing as shown in FIG. 2 remains, however, for cameras that change the f/# of the optics. The proper size aperture for a camera depends on the f/# of the optics and once they change, the aperture may no longer be optimal for the camera. For example, in applications where a wide angle "search" mode is used until a target is acquired, the aperture may be optimal for a wide field of view. Once a target is acquired, the optics may be switched to a narrow field of view, possibly a zoom or telephoto lens. The f/# changes, changing the required cold stop size, and leaving the fixed aperture mismatched to the optics. This problem is addressed in the description of the current best mode of implementing the invention, below.

Figure 3:
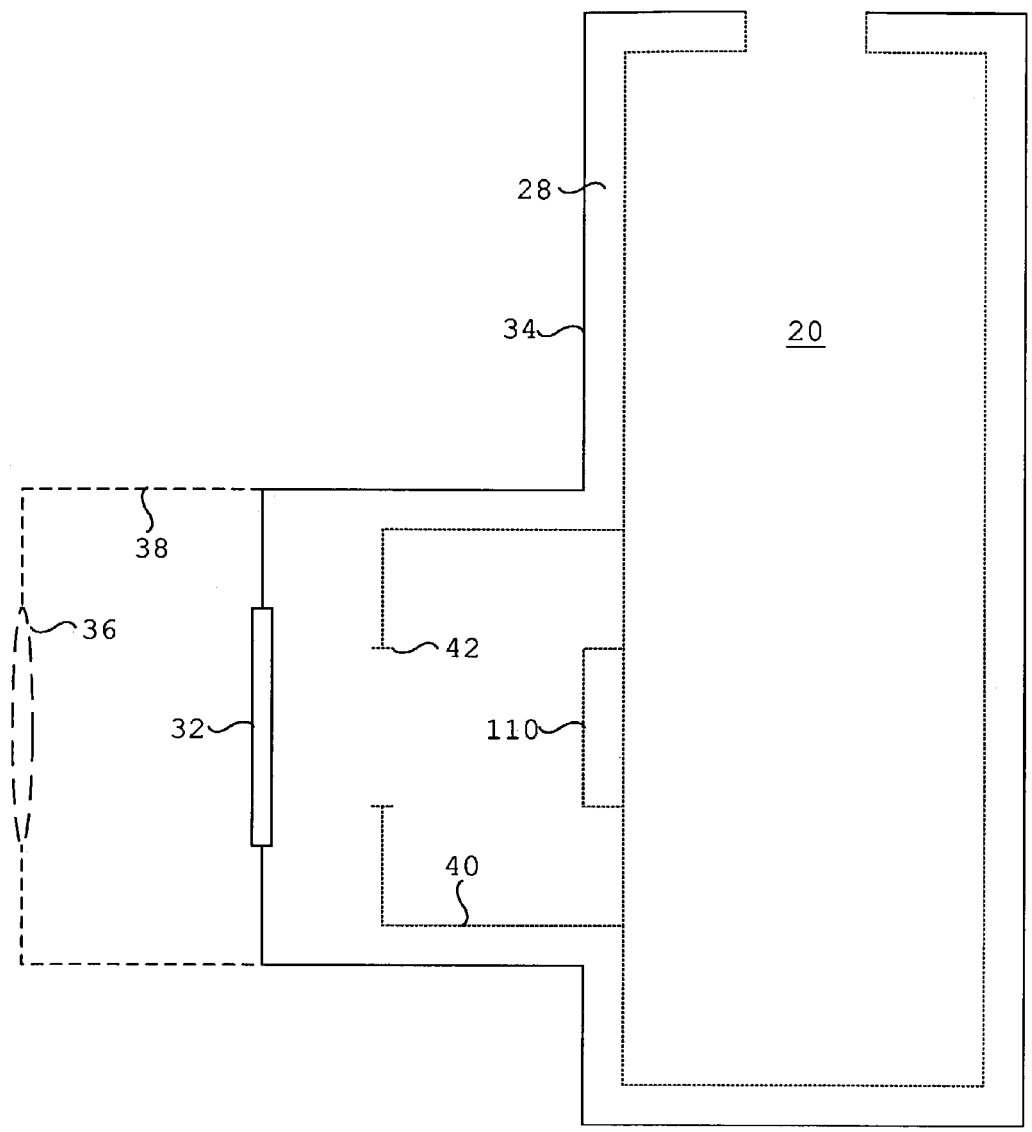
FIG. 3 shows a schematic view of a liquid nitrogen dewar based infrared camera, showing a typical dewar in section.

Continuing the description of the prior art, internally, the various types of prior art thermal infrared cameras are similar. FIG. 3 shows a schematic planar slice view of a typical liquid nitrogen dewar based infrared camera. In this figure, the cooling element is a liquid nitrogen dewar 20 (hereinafter also referred to as an "LN2 dewar"). This is a chamber containing liquid nitrogen to which various parts of the infrared camera may be mounted, especially those requiring cryogenic cooling. Typical (though not required) of LN2 dewars, the camera housing 34 is exemplified as integrated with the vacuum chamber 28. The vacuum chamber 28 extends around the LN2 dewar 20 and the radiation shield 40, so that everything within the exterior housing 34 is within the vacuum chamber and under a vacuum 28. The LN2 dewar is filled with liquid nitrogen and the photocell 110 is mounted directly to the LN2 dewar 20. In this manner, the photocell 110 is maintained at cryogenic temperatures. The radiation shield 40 is also mounted to the LN2 dewar 20, to keep the radiation shield 40 at a similar temperature. Attached to the outside of the camera housing 34 is the external optics housing 38, containing the focusing optics 36. The vacuum is maintained by the transmissive window 32.

Figure 4A:
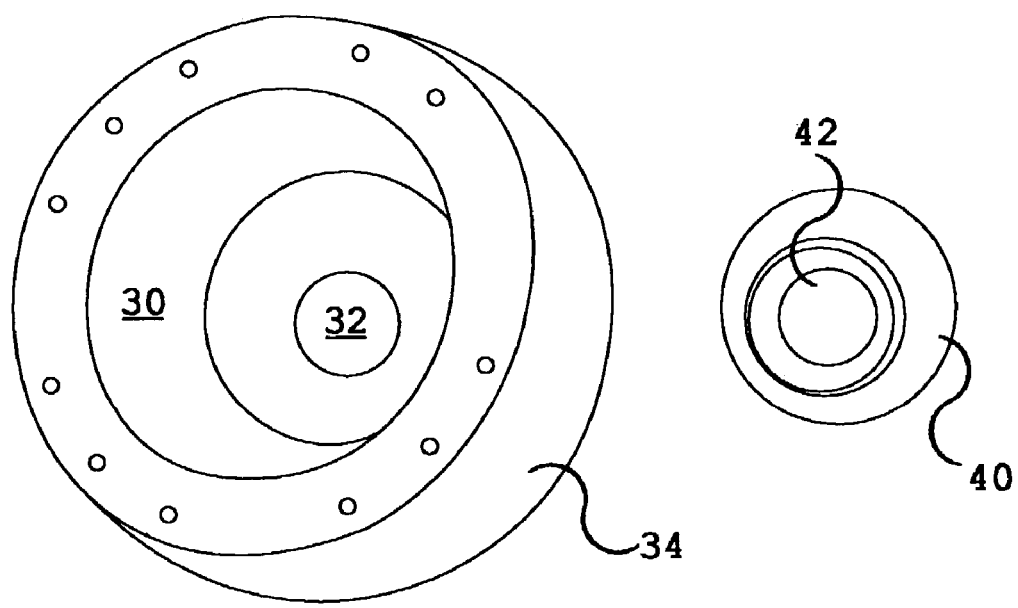
FIGS. 4a and 4b show two schematic views of main components located around the photocell in a liquid nitrogen dewar based infrared camera of the type in FIG. 3, showing also their relative assembled positions in FIG. 4b.

FIG. 4*a* shows in a schematic layout view an exemplary housing and radiation shield of a liquid nitrogen dewar based camera of the type described in FIG. 3. In FIG. 4*a*, the portion of the camera housing 34 that covers the optics section (as opposed to the LN2 dewar section) is shown from the side that normally faces the camera internals. At the center of the housing 34 is the transmissive window 32. The inside wall of the camera housing 34 makes up the wall of the vacuum chamber 30. The radiation shield 40 is shown from an above angle. At the optical entrance and center of the radiation shield 40 is the fixed aperture 42 of the prior art.

Figure 4B:
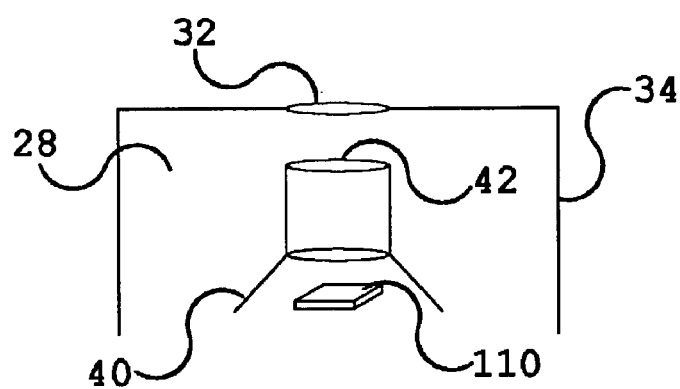

FIG. 4*b* is a side view planar slice of the assembled components, showing their relative locations. The photocell 110 is shown below the radiation shield 40. The radiation shield 40 mounts on the same plane as the photocell 110, both mounting onto the LN2 dewar (not shown). The optical entrance of the radiation shield 40 is the fixed aperture 42. Outside of the radiation shield 40 is located the camera housing 34 with a transmissive window 32. The area around the radiation shield 40 is under a vacuum 28.

Figure 5A:
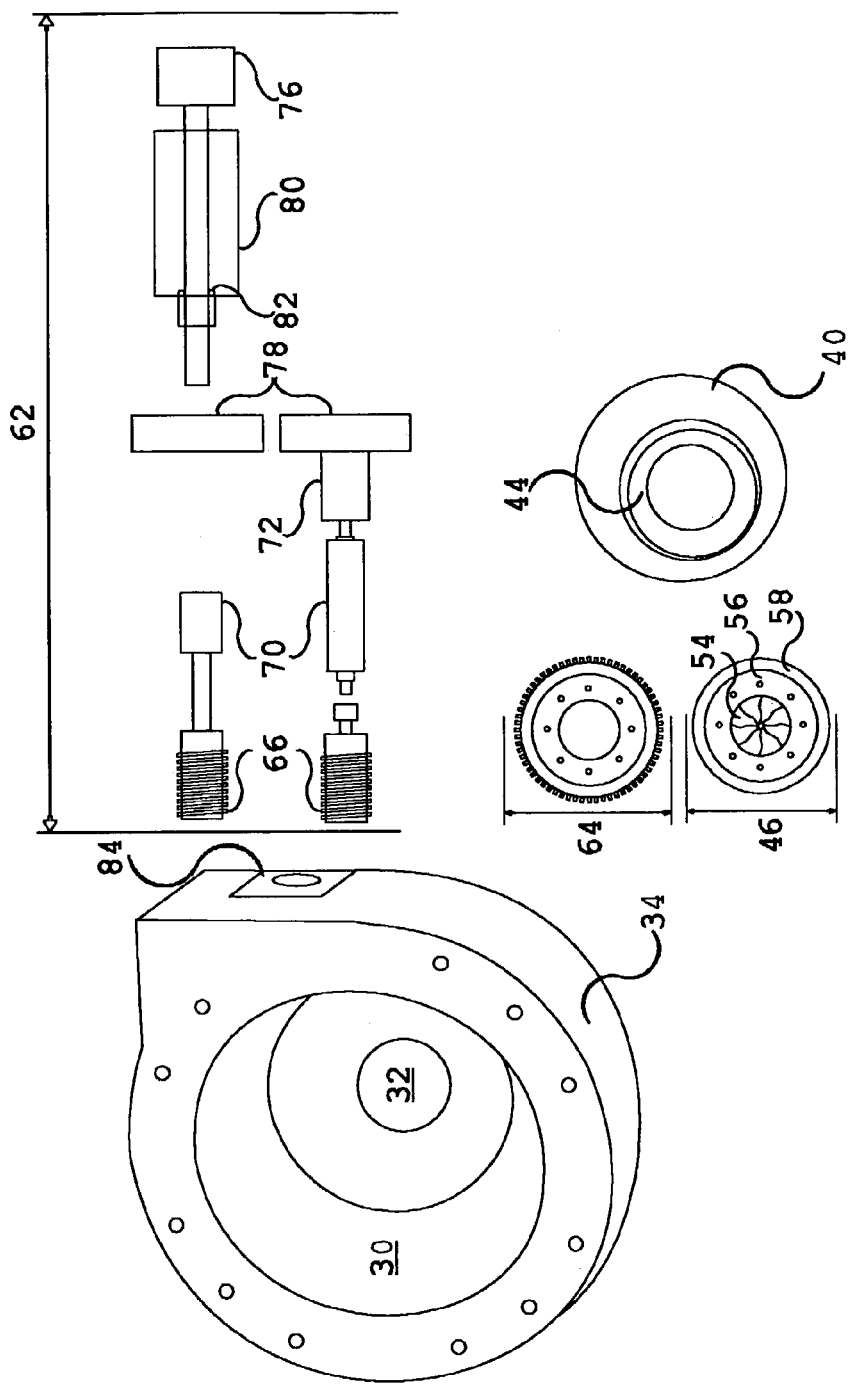
FIGS. 5a and 5b show a schematic layout views of an embodiment of the inventive apparatus, arranged as in FIGS. 4a and 4b, respectively, to highlight the additions involved in implementing a variable diaphragm, showing each of the components necessary for a gear driven embodiment of the invention, each component in its approximate final assembly order.

In order to implement a variable diaphragm, several new mechanisms are necessary. FIG. 5*a* shows a schematic layout view of an embodiment of the inventive apparatus, arranged as in FIG. 4*a*, but demonstrating some of the major differences involved in implementing a variable diaphragm or swappable aperture. In order to accommodate mechanical aperture control means, the vacuum chamber 30 and housing 34 must be modified to add either a motor control means mounting location 84 or means for transferring mechanical force through the wall of the vacuum chamber, also at 84. Directly exterior to this location 84 are two exemplary worm gear systems 62 comprised of several shown parts.

Both worm gear examples use a worm gear screw 66 attached through a coupler 70 to the control means. In the case of the top system, the vacuum chamber seal 78 is penetrated by a rotary dial adjuster 76 and a vacuum feed-through 80. In this example, the dial adjuster 76 contacts warm air outside of the housing 34. Since the coupler 70 and the rest of the worm gear system are within the vacuum chamber 30, the dial adjuster 76 and coupler 70 must be made of minimally heat-conductive materials. Moreover, in either the manual or motorized worm gear examples, the coupler 70 for the dial adjuster 76 must minimize the heat transference to the variable diaphragm 46. In addition, there must be a high performance vacuum seal for the vacuum feed-through 80, capable of maintaining high vacuum. One of the several seals necessary is shown 82. This system allows the infrared camera operator to adjust the aperture size manually and directly.

The second worm gear system 62 shown utilizes a motor drive 72 rather than a rotary dial adjuster 76. The motor drive 72 is attached to the vacuum chamber seal 78 and the coupler 70. Through the coupler 70, the motor drive 72 turns the worm gear screw 66. In this arrangement, the motor drive 72 must be vacuum-capable, which means that it must not outgas, must use special coatings, must be capable of shedding heat through the vacuum chamber 30 and camera housing 34, and must not have exposed electrodes that may cause a corona effect.

A further complication may arise when using a stepper motor 72 of the appropriate size. Such a motor 72 is not likely to have sufficient torque to operate variable diaphragm 46. In this case, the inventive system contemplates the use of a reduction gearbox. Such a gearbox would be located between the motor 72 and the worm gear screw 66, where the coupler 70 is shown in the figure.

In infrared cameras that do not merge the camera housing 34 and vacuum chamber 30, it can be easier to maintain a cryogenic temperature at the important parts of the camera. In such a case, the motor 72 could be mounted external to the vacuum chamber 30, to reduce heat transference to the cryogenic parts. Mounted externally, the motor 72 would not need to be vacuum-safe, and could be a normal motor, simply associated to a vacuum feed-though of the type shown at 80. This embodiment simply drives the vacuum feed-through and rotary dial adjuster using an externally mounted motor.

In either arrangement, the worm gear screw 66 then contacts the driven gear 64. This connection should be as thermally isolative as possible, using less conductive materials or insulators for the parts of the mechanisms. The driven gear 64 is attached to the variable diaphragm 46 and the assembly is mounted to the optical entrance of the radiation shield 40 at aperture mounting location 44 (which is where the fixed aperture would have been). The typical variable diaphragm 46 consists of at least three basic parts.

There are iris fingers 54 and two rings 56, 58 that form the aperture mechanism. The iris fingers 54 form smaller or larger apertures as they are manipulated. Generally, the iris fingers 54 are roughly triangular and have two pivot points. The two pivot points are attached to an inner ring 56 and an outer ring 58. In the closed position, where the variable diaphragm size is at its smallest (nearly completely closed), the pivot points are close to being in line with one another, forming a line perpendicular to the edge of the outer ring 58. As the two rings 56, 58 spin relative to each other, the pivot points move apart, causing the iris fingers to pivot away from the center of the aperture, making the aperture size greater.

The above-described aperture mechanism is known in the art. However, this mechanism allows the driven gear 64 to be attached in such a way that the whole worm gear system 62 can open and close the aperture. Although the best mode of implementation will vary by the application, one possible arrangement, which is an embodiment of the current best mode of implementation, is for the driven gear 64 to be attached to the inner ring 56 (thus, here, the inner ring 56 has features identical to the driven gear 64, allowing the two to be attached physically). The outer ring 58 is then attached to the radiation shield 40 at the aperture mounting location 44. As the worm gear screw 66 turns the driven gear 64, the inner ring 56 is turned relative to the outer ring 58, which is fixed. The variable diaphragm 46 is thus controlled by the worm gear system 62.

The variable diaphragm 46 itself must meet certain requirements. Any portion of the variable diaphragm 46 facing the photocell 110 should be coated in a radiation absorbing material or color. Typiceily, the photocell-side of the radiation shield 40 is coated in black, though the reflectivity in the infrared is more important than the visible-specfrurn "color." The iris fingers 54 must be allowed to move along one another freely, without relying on greases or other outgassing lubricant materials. For this reason, the blades should be coated with a material functionally similar to TEFLON® brand polytetrafluoroethylenes The result is that the iris fingers 54 must be low friction and low reflectivity coated. Finally, the focusing lens side of the aperture 46, including the iris fingers, should be coated in a reflective material, such as gold. This prevents aperture 46 from warming while it is blocking radiation by reflecting that radiation away. A reflective coating prevents the aperture 46 from heating and transferring that heat from its photocell-side to the photocell, causing unwanted radiation load. As a last caveat, the reflective coating of the iris fingers 54 must be specifically designed not to shed reflective material onto the photocell-side of the overlapping iris fingers.

Figure 5B:
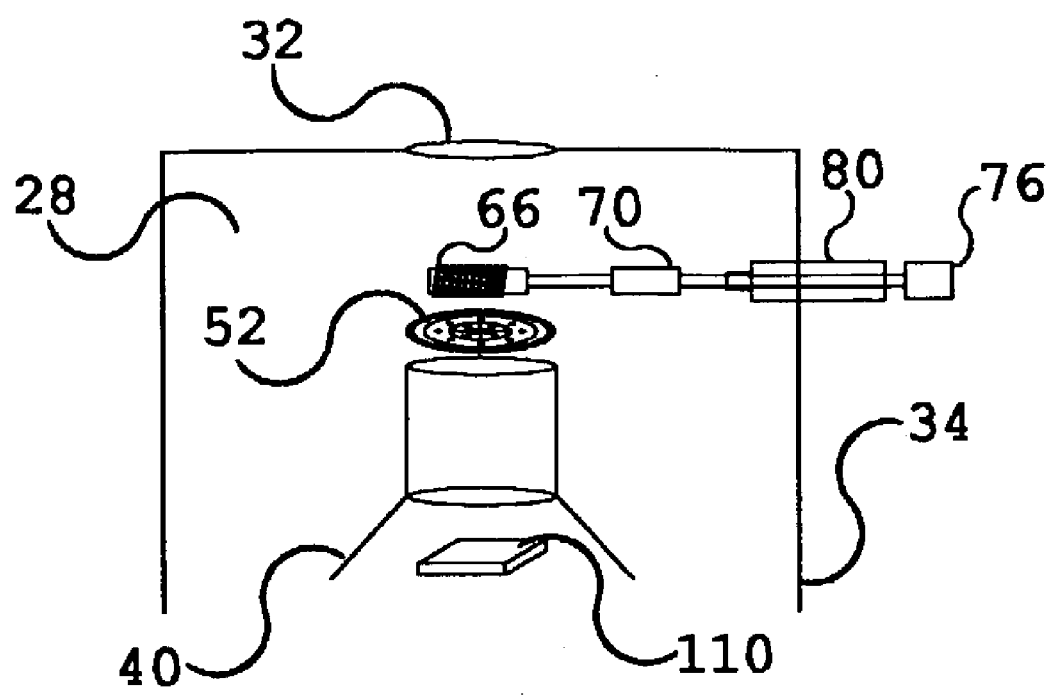

FIG. 5*b* shows the mechanism of FIG. 5*a*, assembled and in planar sliced view, as in FIG. 4*b* of the prior art. This figure shows the relative locations of each of the parts shown in FIG. 5*a*, as assembled. Here, the photocell 110 and radiation shield 40 would be attached to an LN2 dewar (not shown). The variable diaphragm and driven gear are shown attached to each other in a single combined unit 52. The combined gear and aperture 52 is shown above the radiation shield 40 where it would be attached. The worm gear screw 66 can be seen adjacent to the combined gear and aperture 52, where it can engage the gear and manipulate the aperture. The coupler 70 attaches the worm gear screw 66 to the vacuum feed-through 80 and the rotary dial adjuster 76. The vacuum feed-through 80 is shown penetrating the camera housing 34 into the vacuum 28.

FIGS. 6*a*, 6*b*, 6*c*, 6*d*, 6*e*, 6*f*, and 6*g* show schematic views of several embodiments of the inventive aperture drive mechanisms, shown without other parts of the infrared camera. For the sake of simplicity, the apertures and gears are shown as single combined units, though it is to be understood that they can be separate or joined units. Furthermore, although there are seven examples described herewith, these examples are not limiting, and serve to teach the inventive apparatus and method. Additional embodiments will become obvious to those skilled in the art. FIG. 6*a* shows a schematic view of an exemplary gear driven swappable fixed aperture. In this Figure, the worm gear 66 of the type in FIGS. 5*a* and 5*b* drives a swappable aperture wheel 48. The aperture wheel 48 has three fixed apertures in this exemplary view. When the worm gear screw 66 drives the swappable aperture wheel 48, the various size apertures are positioned into the optical path. FIG. 6*b* shows in schematic view a gear driven example of the inventive aperture system, as in FIG. 6*a*, with a gear cog 68 instead of a worm gear.

FIG. 6*c* shows a schematic view of a third possible embodiment of the inventive system, using a swappable partial aperture wheel 50 that inserts a small aperture in front of a larger fixed aperture. This system would provide a smaller aperture under those conditions that so warranted. For example, in a targeting system that uses a wide field of view when scanning for targets and swaps optics to a zoom lens with a narrow field of view once a target has been acquired, two aperture sizes may be sufficient. Although shown with a worm gear screw 66, this would also work with a gear cog of the type in FIG. 6*b*. Further, the invention contemplates a swappable partial aperture wheel comprised of a variety of shapes and configurations, not limited to partial circles (for example, where the "circle" is more roughly rectangular in shape, with a pivot point either at an end or at the middle, it can be referred to as an aperture stick). In the cases such as FIG. 6*c*, where an aperture is inserted into the optical path, the aperture should be located closely to the fixed aperture beneath it, to minimize changes that would affect radiation shield efficiency.

FIG. 6*d* shows a schematic view of a piezoelectric motor driven swappable aperture. This embodiment is otherwise similar to the aperture of FIG. 6*a*; however, this exemplary embodiment does not use a gear on, or attached to, the aperture disc. Here, a piezoelectric motor 90 contacts the outer ring 94 of the aperture wheel 48 with its piezo element 92. The outer ring 94 of the aperture wheel 48 is replaced with a friction surface with a sufficient coefficient of friction (the current best mode for implementing this embodiment is to use a ceramic ring for the friction surface).

FIG. 6*e* shows a schematic view of a piezoelectric motor driven variable diaphragm. As in FIG. 5*a*, the variable diaphragm 46 can be attached to the radiation shield through the inner ring 56, and the outer ring 58 can likewise be turned by the piezoelectric motor 90 and piezo element 92 to actuate the variable diaphragm 46. In the cases of piezoelectric motors, the motors can be mounted as shown in FIGS. 6d and 6e, or they may be mounted beneath or above the aperture and may actuate the variable diaphragm or swappable fixed aperture from the top or bottom surfaces rather than the outside surface of the aperture.

FIGS. 6f and 6g show schematic views of magnetic control means. Magnetic control means offer several distinct advantages, including not requiring any physical intrusion into the vacuum chamber (reducing the possibility of a vacuum leak) and fewer parts likely to outgas being placed into the vacuum chamber. The magnetic control means are thus most useful in cases where highly sensitive photocells are used and temperature control is of the utmost concern. FIG. 6f shows a schematic view of magnetic drive system that uses a conventional motor system. The variable diaphragm 46 is as described before, and can be a swappable fixed aperture, as well, though not shown here. The outer ring 58 (or the outer edge of a swappable fixed aperture, not shown) has affixed to it at least one permanent magnet 96, with two shown here. The dashed line represents the vacuum chamber wall 30, outside of which is located the magnetic drive ring 98, with at least one permanent magnet 96 affixed to it, here two. Any of the drive mechanisms described in this invention, or any other drive mechanism, can be used to drive the magnetic drive ring 98. In this figure, a worm gear 66 is shown.

When the worm gear 66 turns the magnetic drive ring, the magnetic field created by the permanent magnets 96 cause the permanent magnets 96 affixed to the variable diaphragm 46 to move. This actuates the diaphragm or changes the fixed apertures as described above.

FIG. 6g, similarly, uses magnetic fields to turn the variable diaphragm or swap fixed apertures. In this figure, the variable diaphragm 46 has permanent magnets 96 affixed and is located within the dashed vacuum chamber wall 30. Outside the vacuum chamber 30 are located one or more electromagnets 100 positioned directly outside of the non-magnetic vacuum chamber wall 30. As the current increases to the electromagnets 96, the field generated changes and the permanent magnets 96 are forced to move within the field and actuate the variable diaphragm 46 or swap fixed apertures (not shown).

A further configuration possibility includes the use of a mechanical system such as a belt or chain either directly driving the aperture or driving a pulley attached to the aperture. In fact, many similar configurations may suggest themselves to those skilled in the art and such skilled persons should be enabled to utilize such configurations by applying the inventive method described herewith.

In any of these swappable aperture cases, there must be detection means for determining when the swappable apertures are in position above the underlying fixed aperture or hole in the aperture mounting location. The detection means can involve detents that stop the aperture wheel as it rotates under the manipulation of the piezoelectric motor, or contacts on the disc that send a signal to the motor control means as they pass another electrical contact fixed to some non-moving portion of the thermal infrared camera. Furthermore, optical means can be used for positioning, as well as many other possible methods of implementing such detection means, and such methods are also contemplated by the invention.

Figure 7:
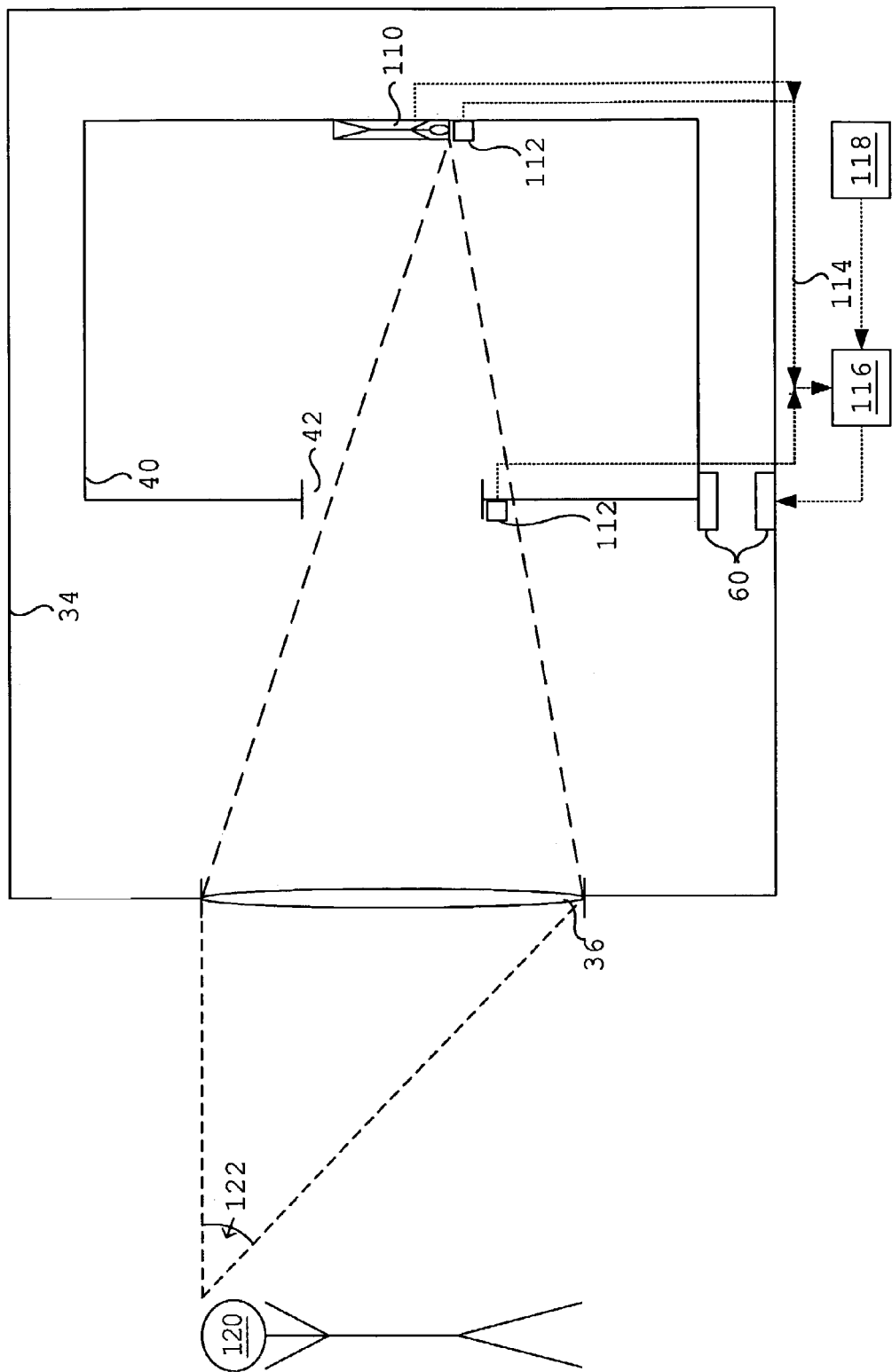
FIG. 7 shows a schematic view as in FIG. 2, showing possible locations of sensors for exemplary logic control systems for controlling the variable diaphragm.

Finally, FIG. 7 shows an update to the schematic view of FIG. 2, incorporating several exemplary parts of a logic control system for controlling the inventive apertures. In order to keep the Figure simple, the aperture control means and variable diaphragm are not shown in detail. The aperture control means is simply shown as generic boxes 60. For completeness, the camera housing 34 is also shown. The cone of radiation 122 entering the camera through the focusing lens 36 arrives at the aperture 42 and is partially obstructed by the aperture. Located between the focusing lens 36 and the aperture 42, mounted near the aperture 42, is a sensor 112 that measures the quantity of radiation arriving at the shown location. The sensor 112 is connected by wire 114 to the logic control module 116 (sending information to the control module, as indicated by the arrowheads). The photocell 110 also provides an output that is connected (indirectly, but shown for simplicity as directly connected) to the logic control module 116. An additional sensor 112 is shown adjacent to the photocell 110, also connected via wire 114 to the control module 116. Although both the sensors 112 and the photocell 110 are shown connected to the control module 116, these are each exemplary connections. Either one of these connections is sufficient, as would be other similar connections. The invention contemplates one or more sensors bring used in applications requiring the optional logic control system 116.

With at least one sensor of 112 and 110 connected, the logic control system 116 can receive information on the quantity of radiation present and can apply a programmed algorithm to determine the appropriate size for the aperture 42. The logic control module 116 can then provide a signal to cause the aperture control means 60 to affect the size of the aperture 42. If the sensor used is the photocell 110 or any other sensor located within the radiation shield 40, the logic control system 116 can be feedback based, so that as the aperture size changes, the data to the logic control module 116 changes. Generic input means 118 allow the user to modify the aperture size manually.

The aperture size can also be changed via control logic that is tied to the selection of the interchangeable lens. When the user switches from search to track mode on the infrared camera and thus swaps lens elements, the variable aperture reacts accordingly and adjusts properly to match the f/#.

INDUSTRIAL APPLICABILITY

It is clear that the infra-red camera diaphragm apparatus and method will have wide industrial applicability, not only to military, police, search and rescue applications, but also to other applications where infrared signals may be present in a wide variety of quantities, such as in agriculture. The inventive apparatus and method will further have great applicability in any circumstance where the dynamic range of the given electronics is insufficient, where various f/#s are needed, or where additional user tunability is desired.

What is claimed is:

1. An infra-red imaging camera comprising:

a housing defining a housing chamber;

an optical lens for coupling infra-red images of objects incident on said lens from the exterior to the interior of said housing, said optical lens including a central axis and further including an adjustable focal length to permit a user to selectively change the focal length of said optical lens at least between a short focal length to permit a distant view of a given exterior object and defining a first optical f-stop and a long focal length to permit a close-up view of said given exterior object and defining a second optical f-stop;

a vacuum chamber located inside said housing, said vacuum chamber being in-vacuum and including a vacuum window located at a front end of said vacuum chamber for admitting to the interior of said vacuum chamber infra-red images that enter said housing through said optical lens, said vacuum window being positioned coaxial of said central axis and in spaced relation to said optical lens;

an infra-red photocell for converting incident infra-red images to electrical signals, said infra-red photocell being housed inside said vacuum chamber coaxial of said central axis and in heat insulated relationship with the walls of said vacuum chamber, and said infra-red photocell including a planar photosensitive surface that is suitable for cooling to a cryogenic temperature;

a variable aperture device located in said vacuum chamber for permitting passage of infra-red images admitted into said vacuum chamber via said vacuum window to said infra-red photocell and defining a camera f-stop, said variable aperture device including a front side facing said optical lens and a rear side facing said infra-red photocell;

said rear side of said variable aperture device including a radiation absorbing coating for preventing reflection of light to said photocell and said front side of said variable aperture device including a radiation reflective coating for reflecting incident light away from said variable aperture device;

a radiation shield for supporting said variable aperture device inside said vacuum chamber in front of and surrounding said infra-red photocell, said radiation shield being in thermal conductive relationship with said variable aperture device and comprising a heat transmissive material;

said radiation shield including an inside surface facing said central axis that contains a parasitic radiation absorbent coating to prevent parasitic radiation from being reflected to said photocell and an outer heat reflective surface for reflecting incident radiation thereon outwardly to inhibit heating; and mechanical adjusting means coupled to said variable aperture device for adjusting the aperture to match said camera f-stop to the optical f-stop exhibited by said optical lens to minimize entry of extraneous rays of light, and, should the infrared radiation received when said camera f-stop is so matched to said optical f-stop be too intense for said photocell, for increasing said camera f-stop to reduce the infrared radiation received by said photocell.

2. The infra-red imaging camera as defined in claim 1, comprising:
cryogenic cooling means for cooling said infra-red photocell, said radiation shield, and said variable aperture device to a cryogenic temperature to maintain said infra-red photocell, said variable aperture device and said radiation shield, at a significantly lower temperature than said housing and said walls of said vacuum chamber.

3. The infrared camera as in claim 2, wherein said variable aperture device is controlled by a logic control means, said logic control means receiving the f-stop of said optical lens and causing said mechanical adjusting means to adjust said aperture to maintain a desired cold stop.

4. The infrared camera as in claim 2 wherein said lens is comprised of a wide field of view configuration and a narrow field of view configuration and said aperture selection means provides at least two aperture sizes.

5. An improvement to an infrared camera as in claim 2 wherein said variable aperture device is selected from one of an aperture wheel, a partial aperture wheel, and an aperture stick.

6. The infra-red imaging camera as defined in claim 2, wherein said variable aperture device comprises: a variable iris, said variable iris including a plurality of fingers, each of said fingers being coated with a non-outgassing greaseless solid lubricant material.

7. The infra-red imaging camera as defined in claim 2, wherein said variable aperture device includes:

a plurality of apertures, each of said apertures being of a different area in size for transmission of respectively different intensity levels of said infra-red image to said infra-red photocell with one of said plurality of apertures comprising a default aperture that is positioned coaxial of said central axis for passing received infra-red images to said infra-red photocell, aperture selection means for selecting another one of said plurality of apertures to replace said default aperture and pass infra-red images, and wherein said mechanical adjusting means comprises:
motor means for moving said aperture selected by said aperture selection means from a position off of said central axis into coaxial position on said central axis, whereby said selected aperture may pass an infra-red image to said infra-red photocell;

said plurality of apertures in said variable aperture device, other than said default aperture, being initially stowed in said vacuum chamber behind said vacuum window off of said central axis and in front of and spaced relationship to said infra-red photocell.

8. The infra-red imaging camera as defined in claim 7, wherein said variable aperture device further comprises:
a circular disk having a center, a major axis and being mounted for rotation about said major axis; said circular disk Including a plurality of circular apertures of different size, said circular apertures being angularly spaced about the center of said disk and being located between said center and the periphery of said disk, wherein each of said plurality of apertures may be positioned coaxial of said central axis in sequential order in response to rotation of said circular disk.

9. The infra-red imaging camera as defined in claim 8, wherein said circular disk includes gear teeth along the periphery of said disk to define a gear; a drive gear coupled to said gear teeth on said disk; and wherein said motor means drives said drive gear.

10. The infra-red imaging camera as defined in claim 7, wherein said variable aperture device further comprises: a sector of a circular disk, said sector including a disk center and a major axis of rotation of said disk sector; said disk sector including a circular aperture therethrough of a size smaller than said default aperture, said aperture being located between said disk center and the periphery of said sector, wherein rotation of said sector moves said circular aperture to a position coaxial of said central axis and in line with said default aperture.

11. The infra-red imaging camera as defined in claim 10, wherein said sector includes gear teeth along the circular periphery of said sector to define a gear; a drive gear coupled to said gear teeth on said disk; and wherein said motor means drives said drive gear.

12. The infra-red imaging camera as defined in claim 7, wherein said motor means comprises a piezoelectric motor.

13. The infra-red imaging camera as defined in claim 2, wherein said mechanical adjusting means comprises:
a first portion external of said vacuum chamber;
a second portion internal to said vacuum chamber;
and a third portion mechanically coupling said first and second portions;
said third portion comprising a minimally heat-conductive material to prevent heat from the exterior of said vacuum chamber from entering said vacuum chamber.

14. The infra-red imaging camera as defined in claim 2, wherein said mechanical adjusting means includes a piezoelectric motor.

* * * * *